(12) United States Patent  
Erario et al.

(10) Patent No.: US 8,525,472 B2  
(45) Date of Patent: Sep. 3, 2013

(54) INDUCTIVE CHARGING SYSTEM IN COMMUNICATIONS WITH OBJECTS BEING CHARGED AND WITH MICROPROCESSOR CONTROLLED DIAGNOSTICS

(75) Inventors: Richard Erario, Wilton, CT (US); John Erario, Woodhaven, NY (US)

(73) Assignee: Accurate Technologies Inc., Woodhaven, NY (US)

( * ) Notice: Subject to any disclaimer, the term of this patent is extended or adjusted under 35 U.S.C. 154(b) by 282 days.

(21) Appl. No.: 12/894,838

(22) Filed: Sep. 30, 2010

(65) Prior Publication Data

US 2011/0074345 A1  Mar. 31, 2011

Related U.S. Application Data

(60) Provisional application No. 61/247,240, filed on Sep. 30, 2009.

(51) Int. Cl.  
*H01M 10/46* (2006.01)

(52) U.S. Cl.  
USPC ........................................... 320/108

(58) Field of Classification Search  
USPC .................................. 320/107, 108, 114, 115  
See application file for complete search history.

(56) References Cited

U.S. PATENT DOCUMENTS

| 4,660,039 | A * | 4/1987 | Barricks et al. | 342/27 |
| 6,620,057 | B1 * | 9/2003 | Pirritano et al. | 473/353 |
| 6,768,450 | B1 | 7/2004 | Walters et al. | |
| 7,034,747 | B1 | 4/2006 | Walters et al. | |
| 7,095,312 | B2 | 8/2006 | Erario et al. | |
| 7,274,168 | B2 * | 9/2007 | Tskukamoto et al. | 320/106 |
| 2004/0058749 | A1 * | 3/2004 | Pirritano et al. | 473/353 |
| 2011/0077094 | A1 | 3/2011 | Erario et al. | |
| 2011/0077112 | A1 | 3/2011 | Erario et al. | |
| 2012/0029666 | A1 * | 2/2012 | Crowley et al. | 700/91 |

* cited by examiner

*Primary Examiner* — Edward Tso  
(74) *Attorney, Agent, or Firm* — McCarter & English, LLP

(57) ABSTRACT

A method for wirelessly charging and/or re-charging at least one sports object embedded with a battery and circuitry is provided. The method includes positioning the sports object proximate to a charging system, the charging system containing circuitry for wirelessly communicating with the sports object, whereby information is bi-directionally transferred by radio frequency and electric power is transferred to the sports object by induction. The sports object circuitry is adapted for determines a charging requirement of the power cell therein.

9 Claims, 1 Drawing Sheet

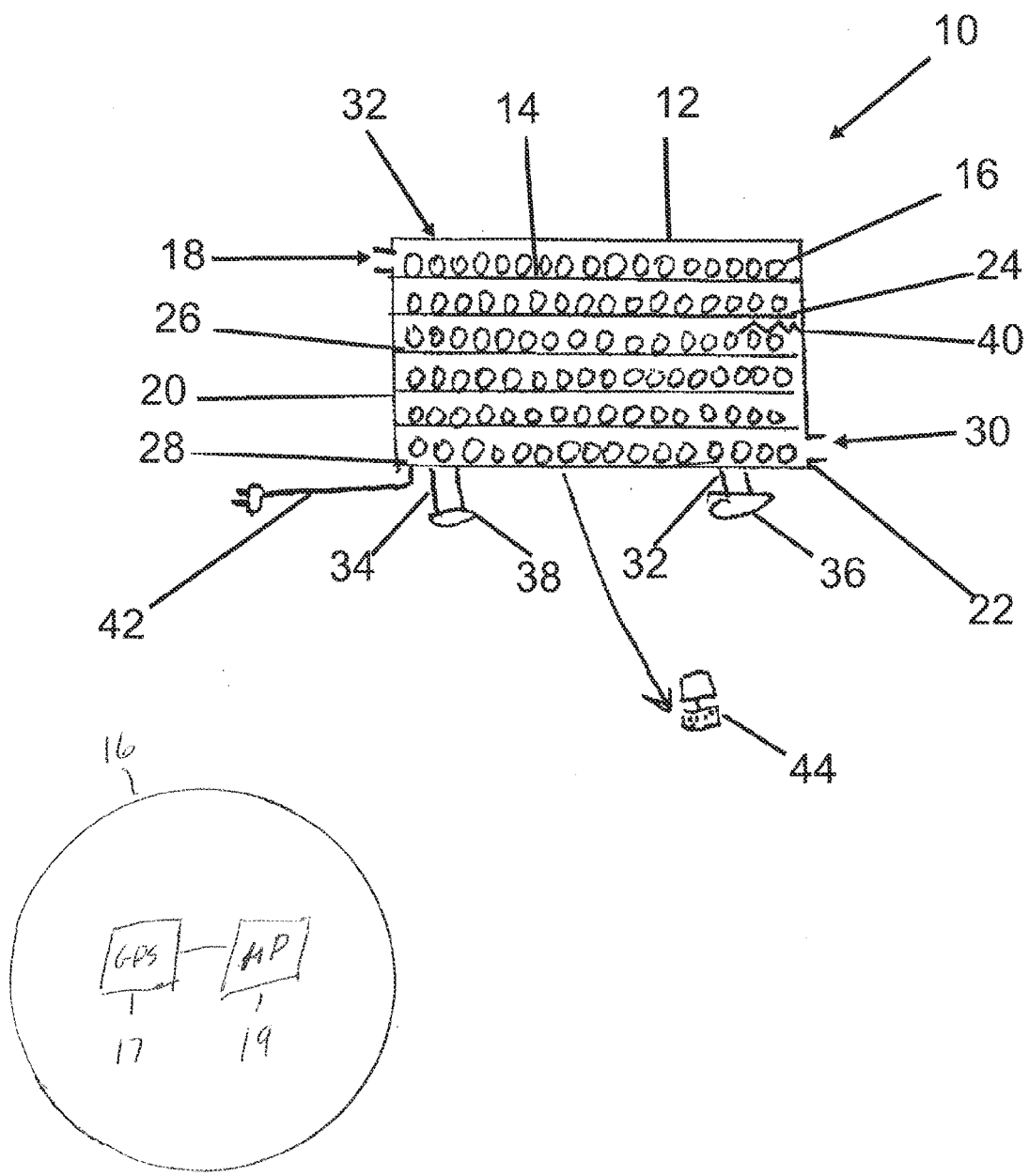

INDUCTIVE CHARGING SYSTEM IN COMMUNICATIONS WITH OBJECTS BEING CHARGED AND WITH MICROPROCESSOR CONTROLLED DIAGNOSTICS

BACKGROUND OF THE INVENTION

1. Field of the Invention

The invention relates to battery, power cell, and other charging systems and more particularly to a battery charging system capable of simultaneously charging plural batteries disposed in plural objects.

2. Background of the Related Art

It is well known in the prior art that wireless means are taught for recharging power cells in a variety of electronic appliances. However in the case of a power supply embedded in a sports object there is no solution for determining the state of the battery. A typical sports object does not have a video or other interface that allows such determination to be made. Battery state must be ascertained before the sports object can be used with any degree of confidence.

U.S. Pat. No. 7,274,168 to Tsukamoto for a "Battery Charging System Distinguishing Primary And Secondary Batteries," granted Sep. 25, 2007, the disclosure of which is incorporated herein by reference in its entirety, provides a charging system using induction technology which is particularly suitable for hearing aids. More specifically, the patented invention is tailored to a hearing aid having plural rechargeable batteries, where the rechargeable batteries are distinguishable from each other by, for example, battery type. Based on the differences between the batteries, the charger will determine which battery to recharge.

It is an object of the present invention to provide for simultaneously charging plural wirelessly chargeable sports objects.

It is a further object of the invention to provide, in an environment where sports objects equipped with embedded power cells are used, a single charging tray, bin, or the like to charge many objects at the same time.

SUMMARY OF THE EMBODIMENTS

A method for wirelessly charging and/or re-charging at least one sports object embedded with a battery and circuitry is provided. The method includes positioning the sports object proximate to a charging system, the charging system containing circuitry for wirelessly communicating with the sports object, whereby information is bi-directionally transferred by radio frequency and electric power is transferred to the sports object by induction. For example, the sports object circuitry monitors the charge state of the power cell that depending upon the embodiment may be a battery or other power source, and compares the charge state to pre-defined thresholds, and recharges such battery if necessary.

BRIEF DESCRIPTION OF THE FIGURES

It is to be understood that the accompanying FIGURE along with the disclosure herein depict details of only typical embodiments of the invention and are not therefore to be considered to be limiting of its scope.

DESCRIPTION OF THE EMBODIMENTS

Turning to the FIGURE, the inductive charging system is disclosed. The system 10 includes a shelf system 12 comprising plural individual shelves. While six shelves are illustrated, the system is not limited to, nor does it require, six shelves. For example, tubes, sleeves, customized holders, containers, or other means may house the sports objects to be charged.

Each shelf 14 is adapted to receive and store plural sporting objects, which are illustrated as balls 16. While each shelf is illustrated as storing more than a dozen balls, the number of balls both storable and stored on any given shelf can be modified by one of ordinary skill without departing from the scope of the invention.

The top shelf 14 is provided with an entry 18 through which balls can be fed into the shelf system 12. The entry 18 is on a first side 20 of the shelf system, which is illustrated as the left side. Towards the second side 22 of the system, which is illustrated as the right side, the top shelf 14 would have an opening (not illustrated) large enough to allow the ball to drop to the shelf below 24. Furthermore, the top shelf 14 would be pitched towards the right side 22 to transport balls towards the opening in the top shelf 14 so that they drop onto the shelf below 24. The shelf below 24 would be pitched to the left and have an opening on the left side to transport balls to the next shelf 26.

Each shelf would be pitched and include an opening at the end thereof, with the exception in the bottom-most shelf 28, which is pitched but does not have a bottom opening at the right side. Rather the shelf system 10 has an opening in the right side 30, in the area of the bottom shelf 28. The opening 30 is raised from the base of the bottom-most shelf 30 so that balls do not merely fall out but rather are selectively drawn out by a person. It is conceivable that a person may be required to insert money or a key to obtain access to one or more balls lined-up at the exit 30.

The shelf system 10 has a front face 32. The front face 32 can be clear so as to enable a user to see the quantity of balls on each shelf. The front face 32 can be selectively removable to enable cleaning or clearing jams.

The shelf system 10 is raised from the ground by plural legs 32, 34, which are supported by plural feet 36, 38. The benefit of raising the system is to enable a user to comfortably remove the balls from the exit 30 without having to reach to the floor.

The shelf system 10 has circuitry 40, including a power cord 42, and the balls have matching circuitry and a battery (not shown) such that the system 10 and balls are capable of being powered and capable of communicating therebetween. From this communication, information is bi-directionally transferred by radio frequency and electric power is transferred to the balls by induction.

The circuitry includes, for example, a microprocessor and memory and other suitable circuitry to enable processing, storing and the wireless exchange of instructions, information and, as indicated, power through induction for charging and/or recharging the battery in the balls. For example, the present invention provides for the embedded microprocessor within the sports object to control a series of programmable charging options, diagnostics, or the like. The diagnostics can monitor, for example, the state of charge or discharge, the rate of recharge, battery voltage, and the like. Alternatively, microprocessor control of such sports object diagnostic events can be controlled by the charging station itself. Thus, the charging systems may obtain information from the sports object and may or may not take programmable action that is not necessarily related to the charging event.

The balls 16 are Smaart™ balls, so that, as shown in the insert of the FIGURE, the circuitry and programming in the balls 16 includes GPS technology 17 so that the location of each ball can be independently determined. The system is compatible with any GPS technology known in the art, or further development. Modifications to microprocessor 19 can be adjusted accordingly to fit any GPS technology. The benefit of such technology is clear when, for example, the balls are golf balls, and a golfer wishes to track his or her balls.

The microprocessor operations may be triggered, and the programs initiated, by a ball being placed in, or in close proximity to, the charging circuitry 40. The charge options may be customized to the various conditions that may be unique to a particular type of sports object. Moreover, the charge time in the ball can be modified depending on the charge in the ball at a given time or other battery conditions discovered through diagnostics. In an alternate embodiment, microprocessor operations may be initiated by means other than proximity to the inductive charging circuit such as passing through an energy field, RFID interrogation, and other sensor and/or interrogation means. For example, microprocessor operations may take place based on proximity to the user and not necessarily proximity to the charging systems The circuitry 40 in the shelf system 10 is capable of controlling on/off operations in the balls through wireless communications. For example, the operation of the microprocessor may be unnecessary after the programs have completed running. Furthermore, there may be no need to run any dedicated GPS electronics within a ball when the ball is disposed in the shelf system 10. While operations of the ball are turned off, the ball should still be able to communicate with the system 10 so as to charge the battery in the ball.

On the other hand, when a ball is in the process of being removed from the shelf system 10, the circuitry 40 in the shelf system 10 could be capable of turning on required hardware in the ball so that, for example, the ball can acquire a GPS fix. This option, to acquire and maintain a GPS fix, should also be able to occur while the battery is being charged by action of the system 10. The circuitry 40 in the shelf system 10 should be capable of activating the microprocessor in the ball while the ball is in the shelf system 10. This would enable programming within the ball to be initiated and the health of the ball to be reassessed, etc.

A systems controller 44 includes, but is not limited to, for example a server, PC, laptop, or microprocessor controlled handheld device. Such hardware as controller 44 also has circuitry for enabling the processing, storing and wireless exchange of information with the balls via the shelf system 10. Alternatively, the balls can communicate wirelessly and directly with such hardware 44. The circuitry in the system's controller 44 can be the same as the circuitry as previously disclosed with the balls unless otherwise required, as would be appreciated by one skilled in the art.

In such a mode, data would be wirelessly transmitted to the controller 44, such as in a report format, including information about the health of the object, the number of times it has been used (e.g., the number of time it has been removed from the shelf system 10), the state of the power cell, such as a battery or other power source (e.g., the charging level, the amount of useful life remaining in the battery), and the like. One would also be able to review the programmable charging options and modify the same as desired through the system's controller 44. Once programmed, the Smaart™ enabled ball programming and electronics are capable of actually controlling the wireless battery charging process.

Accordingly, the present invention provides for wirelessly recharging Smaart™ enabled sports objects in a manner that does not interfere with other ball electronics operations. The sports object may be charged while in an operational mode or non-operational mode. For example, charging may take place while the sports object is attaining/maintaining satellite fix, while it is receiving/transmitting data wirelessly from or to the system's controller, or while it is turned off and not in use.

Moreover, the present invention enables a multiplicity of sports objects with embedded power cells to be charged simultaneously while also providing a means of wireless communication with the sports object to monitor the condition of the power cell. For example, monitoring of the following is included, but not limited to, the state of charge or discharge, the rate of recharge, for example when the power cell is a battery monitoring the battery voltage, and the like.

The present invention may be embodied in other specific forms without departing from its spirit or essential characteristics. The present invention is compatible with any GPS system. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

We claim:

1. A method for wirelessly charging and/or recharging at least one sports object, comprising:
    positioning a sports object embedded with a power cell and circuitry proximate to a charging system, said charging system containing circuitry for wirelessly communicating with said sports object, whereby information is bi-directionally transferred by radio frequency and electric power is transferred to the sports object by induction;
    said sports object circuitry adapted for determining a charging requirement of said power cell battery therein; and
    wherein said sports object circuitry is adapted for wirelessly communicating with a global positioning system for determining the global position of the sports object while wirelessly communicating with said charging system for charging said power cell.

2. The method of claim 1 wherein said sports object circuitry is adapted for wirelessly communicating with a separately located processing device while wirelessly communicating with said charging system for charging said power cell.

3. A method for wirelessly charging and/or recharging at least one sports object, comprising:
    positioning a sports object embedded with a power cell and circuitry proximate to a charging system, said charging system containing circuitry for wirelessly communicating with said sports object, whereby information is bi-directionally transferred by radio frequency and electric power is transferred to the sports object by induction;
    said sports object circuitry adapted for determining a charging requirement of said power cell battery therein; and
    wherein said charging system is adapted to deactivate at least a portion of said circuitry in said sports object while wirelessly communicating with said sports object circuitry for charging said sports object.

4. The method of claim 1 wherein said sport object circuitry is adapted for executing diagnostic routines system while wirelessly communicating with said charging system for charging said power cell.

5. The method of claim 2 wherein said computer is capable of wirelessly monitoring the state of the power cell.

6. The method of claim 1 wherein said circuitry in said sports object includes a microprocessor said microprocessor executes programmed system functions when said power cell charge initiates.

7. The method of claim 6 wherein the microprocessor executes programmed system functions when said power cell charge ceases.

8. The method of claim 2 wherein the sports object circuitry is capable of transmitting a report of sports object diagnostics to said computer system while wirelessly communicating with said charging system for charging said power cell.

9. The method of claim 4 wherein said sports object circuitry is adapted for storing a report of sports object diagnostics system while wirelessly communicating with said charging system for charging said power cell.

\* \* \* \* \*